United States Patent
McMurdie et al.

(10) Patent No.: US 10,614,214 B2
(45) Date of Patent: Apr. 7, 2020

(54) USING MACHINE LEARNING TO DETECT COMMUNICATION CHANNEL ABNORMALITIES IN AN ICS/IIOT APPLICATION

(71) Applicant: Honeywell International Inc., Morris Plains, NJ (US)

(72) Inventors: Kevin McMurdie, Surprise, AZ (US); Ganesh P Gadhe, Pune (IN)

(73) Assignee: Honeywell International Inc., Morris Plains, NJ (US)

( * ) Notice: Subject to any disclaimer, the term of this patent is extended or adjusted under 35 U.S.C. 154(b) by 159 days.

(21) Appl. No.: 15/860,004

(22) Filed: Jan. 2, 2018

(65) Prior Publication Data

US 2019/0205531 A1    Jul. 4, 2019

(51) Int. Cl.
  *G06F 21/55*    (2013.01)
  *G06Q 10/06*    (2012.01)
  *G06F 21/31*    (2013.01)
  *G06N 20/00*    (2019.01)
  *H04W 4/70*    (2018.01)

(52) U.S. Cl.
  CPC .......... *G06F 21/552* (2013.01); *G06F 21/316* (2013.01); *G06N 20/00* (2019.01); *G06Q 10/0635* (2013.01); *H04W 4/70* (2018.02)

(58) Field of Classification Search
  CPC ..... G06F 21/552; G06F 21/316; G06N 20/00; G06Q 10/0635; H04W 4/70
  See application file for complete search history.

(56) References Cited

U.S. PATENT DOCUMENTS

| | | | |
|---|---|---|---|
| 9,697,355 B1* | 7/2017 | Park | G06F 21/552 |
| 10,176,320 B1* | 1/2019 | McMurdie | G06F 21/56 |
| 2013/0063264 A1* | 3/2013 | Oktem | G05B 23/024 |
| | | | 340/540 |
| 2014/0337086 A1* | 11/2014 | Asenjo | G06Q 10/0635 |
| | | | 705/7.28 |
| 2015/0301515 A1* | 10/2015 | Houmb | G06F 21/552 |
| | | | 700/108 |
| 2016/0274558 A1* | 9/2016 | Strohmenger | G05B 19/0428 |
| 2016/0371597 A1* | 12/2016 | Chandramohan | G06Q 10/00 |
| 2017/0026243 A1* | 1/2017 | Berner | H04L 45/42 |
| 2017/0208086 A1* | 7/2017 | Carpenter | H04L 63/1433 |

(Continued)

OTHER PUBLICATIONS

Krishna et al.; "Defence Methodologies of AV Evasion for access control and information assurance in Industrial Distributed control systems and SCADA systems", 2014, IEEE, pp. 1-5. (Year: 2014).*

(Continued)

*Primary Examiner* — Matthew Smithers

(57) ABSTRACT

This disclosure provides a security system and method for using machine learning to improve cybersecurity operations in an industrial control networks and other systems. A method includes collecting, by a security system, current communications channel information for a plurality of devices in a control system. The method includes analyzing, by the security system, the current communications channel information according to one or more device models. The method includes producing, by the security system and according to the analysis, a risk report that identifies an abnormal device among the plurality of devices.

20 Claims, 3 Drawing Sheets

(56) References Cited

U.S. PATENT DOCUMENTS

2018/0191766 A1* 7/2018 Holeman ............ H04L 63/1433
2019/0064787 A1* 2/2019 Maturana ........... G05B 23/0227
2019/0197442 A1* 6/2019 Lu .......................... G06N 20/00

OTHER PUBLICATIONS

Bustamante et al.; "A Methodological Proposal Concerning to the Management of Information Security in Industrial Control Systems", 2016, IEEE, pp. 1-6. (Year: 2016).*
Hassanzadeh et al.; "Towards Effective Security Control Assignment in the Industrial Internet of Things", 2015, IEEE, pp. 1-6. (Year : 2015).*
Gerhards, "The Syslog Protocol", Network Working Group, Adiscon GmbH, Mar. 2009, 38 pages.
Knapp, "Security Intelligence and Analytics in Industrial Systems", Honeywell Users Group Europe, Middle East and Africa, 2014, 29 pages.
Koelemij, "Effective Defense in Depth Strategies for Industrial Control Systems", Honeywell Users Group Europe, Middle East and Africa, 2014, 21 pages.
Koelemij, "Designing a Secure Industrial Control System", Honeywell Users Group Europe, Middle East and Africa, Industrial IT Solutions, 2013, 11 pages.
Koelemij, "Making Cyber Security S.M.A.R.T.", Honeywell Industrial Cyber Security, Honeywell Users Group Europe, Middle East and Africa Training Session, 2014, 63 pages.
Ricks, "System Center 2012 R2 Operations Manager Documentation", Microsoft System Center 2012 R2, Microsoft Corp., Nov. 2013, 1389 pages.
Spear, "Industrial Cyber Security 101", Honeywell Users Group Europe, Middle East and Africa, 2015, 25 pages.
"Certification Testing Specification", OPC Foundation, Release Candidate 1.02, May 2014, 20 pages.
"Guide for Conducting Risk Assessments—Information Security", NIST Special Publication 800-30, Revision 1, NIST, U.S. Dept. of Commerce, Sep. 2012, 95 pages.
"Honeywell Industrial Cyber Security Overview and Managed Industrial Cyber Security Services", Honeywell Process Solutions, Jun. 2014, 19 pages.
"Information Technology—Security Techniques—Information Security Risk Management", BSI Standards Publication, BS ISO/IEC 27005, 2011, 80 pages.
"Risk Management and Critical Infrastructure Protection: Assessing, Integrating, and Managing Threats, Vulnerabilities and Consequences", CRS Report for Congress, RL32561, Feb. 2005, 28 pages.
"Security for Industrial Automation and Control Systems Part 2-3: Patch Management in the IACS Environment", ISA-TR62443-2-3-2015, Jul. 2015, 18 pages.
"Design and Planning Guide for System Center 2012-Operations Manager", System Center 2012, Microsoft Corp., Apr. 2012, 13 pages.

* cited by examiner

USING MACHINE LEARNING TO DETECT COMMUNICATION CHANNEL ABNORMALITIES IN AN ICS/IIOT APPLICATION

TECHNICAL FIELD

This disclosure relates generally to industrial systems. More specifically, this disclosure relates to detecting communication abnormalities in industrial control networks and other networks.

BACKGROUND

Identifying security issues and other problems in industrial control systems and other systems is increasingly important. In particular, communications abnormalities can indicate a hardware problems or security issues. Improved systems are desirable.

SUMMARY

This disclosure provides a security system and method for using machine learning to detect communication channel abnormalities in an industrial control system (ICS) or Industrial Internet of Things (IIoT) application in industrial control networks and other systems. A method includes collecting, by a security system, current communications channel information for a plurality of devices in a control system. The method includes analyzing, by the security system, the current communications channel information according to one or more device models. The method includes producing, by the security system and according to the analysis, a risk report that identifies an abnormal device among the plurality of devices.

Disclosed embodiments include a device or system comprising a controller and a memory, configured to perform processes as described herein. Disclosed embodiments also include a non-transitory machine-readable medium encoded with executable instructions that, when executed, cause one or more processors of a system to perform processes as disclosed herein.

In various embodiments, the security system will also collect known-good communications channel information for the plurality of devices in the control system and augment the one or more device models according to the known-good communications channel information. In various embodiments, the security system collects the known-good communications channel information and augments the one or more device models repeatedly, occasionally, or continuously. In various embodiments, the current communications channel information includes distributed control system (DCS) data or Industrial Internet of Things (IIoT) operations data. In various embodiments, the current communications channel information includes controller operations data. In various embodiments, the current communications channel information includes asset management operations data. In various embodiments, the current communications channel information is collected from a wired or wireless network.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Identifying anomalies in industrial control systems and IIoT enabled devices' communication pathways presents an opportunity to identify potential cyber risks before they are fully realized. By analyzing communication pathways' traffic between nodes in an industrial application setting as well as between IIoT enabled devices and their respective communication targets, a cyber risk mitigation technology can be built that enables a layer of security that is not dependent upon signature detection of known cyber-attacks, but instead learns from normal operation in order to identify anomalous traffic for further analysis. This improvement does not become ineffective over time and require continuous updates to detect the latest threats in the landscape and can be applied to legacy applications that alternative security solutions may not be able to be applied to.

Most ICS communication channel operations are currently monitored by rules based technologies such as intrusion detection systems (IDS) or intrusion prevention systems (IPS) network monitoring tools that are qualified solutions in the ICS space. Rules based technologies require knowledge of threats in order to develop and deploy meaningful countermeasures in a network and are reactive as a result. Behavioral analysis provides proactive analysis as it does not require advance knowledge of specific threats to detect them, only knowledge of what normal communication channel operations look like. Disclosed embodiments include techniques and solutions that address these issues and can specifically address the unique challenges of the industrial control system environment.

Disclosed embodiments can use machine learning algorithms and techniques on valid data to identify communication system behaviors in the Industrial Controls environment that could suggest a risk to the system. Traditional cybersecurity solutions are commonly deployed on each endpoint of a system and introduce overhead to each endpoint that as a result disqualify them from use in an ICS environment due to their resource intensive nature.

IIoT platforms are also subject to emerging cybersecurity concerns and can also be subject to the same limitations of being unable to support traditional cybersecurity solutions due to operational impact or increased system overhead. IIoT solutions are increasingly targeted for cyber offensive operations. Disclosed embodiments address such security risks in a non-invasive manner.

Figure 1:
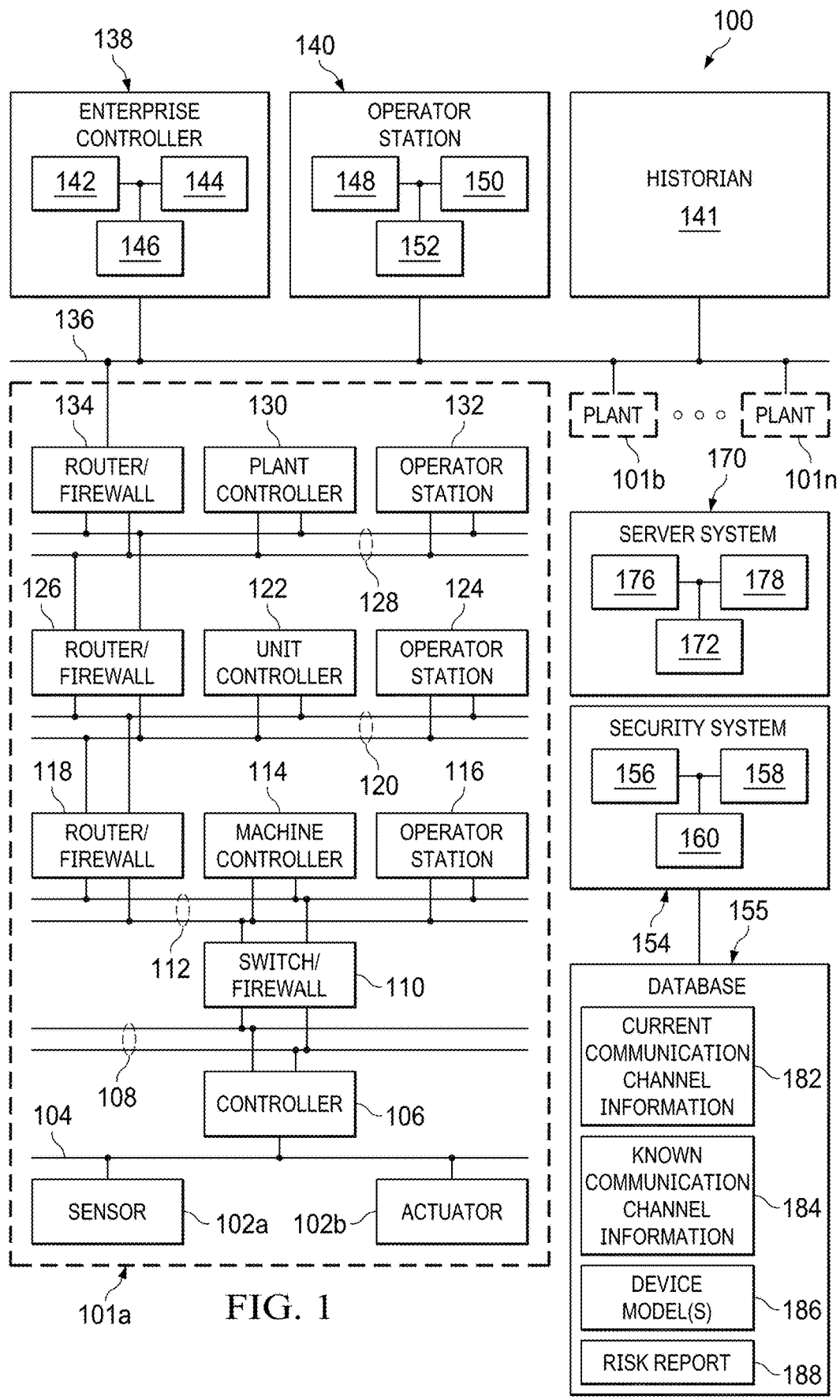
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s). In specific embodiments as discussed herein, network 104 is at least partially implemented as a wireless network, and sensors 102a and actuators 102b are at least partially implemented using wireless devices.

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 could include one or more processing devices 142 and one or more memories 144 for storing instructions and data used, generated, or collected by the processing device(s) 142. Each of the controllers 106, 114, 122, 130, 138 could also include at least one network interface 146, such as one or more Ethernet interfaces or wireless transceivers. Also, each of the operator stations 116, 124, 132, 140 could include one or more processing devices 148 and one or more memories 150 for storing instructions and data used, generated, or collected by the processing device(s) 148. Each of the operator stations 116, 124, 132, 140 could also include at least one network interface 152, such as one or more Ethernet interfaces or wireless transceivers.

By analyzing known good data, machine learning models employing anomaly detection algorithms can be trained to learn what is normal and therefore detect abnormal behavior. According to disclosed embodiments, any particular data in a dataset can be examined using the disclosed models to determine whether there is an abnormality.

Disclosed embodiments can provide near-real-time anomaly detection within industrial communication channels that can detect data exfiltration efforts, malicious software behavior and abnormal behavior resulting from hardware degradation.

Disclosed embodiments can be integrated or adopted in existing products to augment their operations to offer an additional layer of risk detection and mitigation. Disclosed systems and methods provide risk analysis that traditional antivirus analysis and other common cybersecurity solutions cannot offer as they operate on real time data and use known valid data originating from the site of operation. As a result, disclosed embodiments have insight that other security solutions do not leverage. This provides the ability to identify new and emerging risks and potentially identify "zero day" exploits targeting ICS and IIoT environments.

By analyzing known good data, machine-learning models employing anomaly detection algorithms are trained to learn what is normal and therefore detect abnormal behavior. While machine learning models can be trained using live process data, in alternate embodiments, a valid baseline for models can be crafted and deployed by the manufacturer given their intimate knowledge of their own systems, and be used by processes described herein. This can remove any need for running a system for a period in order to establish a baseline.

Disclosed embodiments can analyze communications channel information sent or received by computing end nodes which can provide process and communications data. By training models to learn what normal values are for monitored devices and communication channels, disclosed embodiments can identify abnormalities in near real time (depending on poll times) and trigger an alert for investigation.

Processes and results described herein can be accomplished (among other ways) using a security system 154. Among other things, each security system 154 can be implemented as one or more controller or processor-based systems configured to perform processes as disclosed herein. A security system 154 can be implemented in an IIoT device.

In this example, each security system 154 includes one or more processing devices 156; one or more memories 158 for storing instructions and data used, generated, or collected by the processing device(s) 156; and at least one network interface 160 (wired, wireless, or a combination of these). Each processing device 156 could represent a microprocessor, microcontroller, digital signal process, field programmable gate array, application specific integrated circuit, or discrete logic. Each memory 158 could represent a volatile or non-volatile storage and retrieval device, such as a random access memory or Flash memory. Each network interface 160 could represent an Ethernet interface, wireless transceiver, or other device facilitating external communication. The functionality of the security system 154 could be implemented using any suitable hardware or a combination of hardware and software/firmware instructions. Database 155 can store any data as described herein, including current communications channel information 182, known-good communications channel information 184, device model(s) 186, and a risk report 188, as well as other device or process models, device, process, or communications channel data, and other information as necessary, and can be implemented, for example, in the one or more memories 158.

Processes disclosed herein can also or alternatively be accessed or performed, in some cases, by an external system 170. In this example, the external system 170 includes one or more processing devices 176; one or more memories 178 for storing instructions and data used, generated, or collected by the processing device(s) 176; and at least one network interface 172. Each processing device 176 could represent a microprocessor, microcontroller, digital signal process, field programmable gate array, application specific integrated circuit, or discrete logic. Each memory 178 could represent a volatile or non-volatile storage and retrieval device, such as a random access memory or Flash memory. Each network interface 172 could represent an Ethernet interface, wireless transceiver, or other device facilitating external communication. The functionality of the external system 170 could be implemented using any suitable hardware or a combination of hardware and software/firmware instructions. The external system 170 can be, for example, a stand-alone data processing system, a mobile device, an external server or enterprise system, or otherwise. The exemplary structure of the external system 170 described above is not intended to limit the structure or function of the devices that could be used to implement the external system 170.

Although FIG. 1 illustrates one example of an industrial process control and automation system 100, various changes may be made to FIG. 1. For example, a control and automation system could include any number of sensors, actuators, controllers, servers, operator stations, networks, risk managers, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which the functions of the security system 154 can be used. This functionality can be used in any other suitable device or system.

Figure 2:
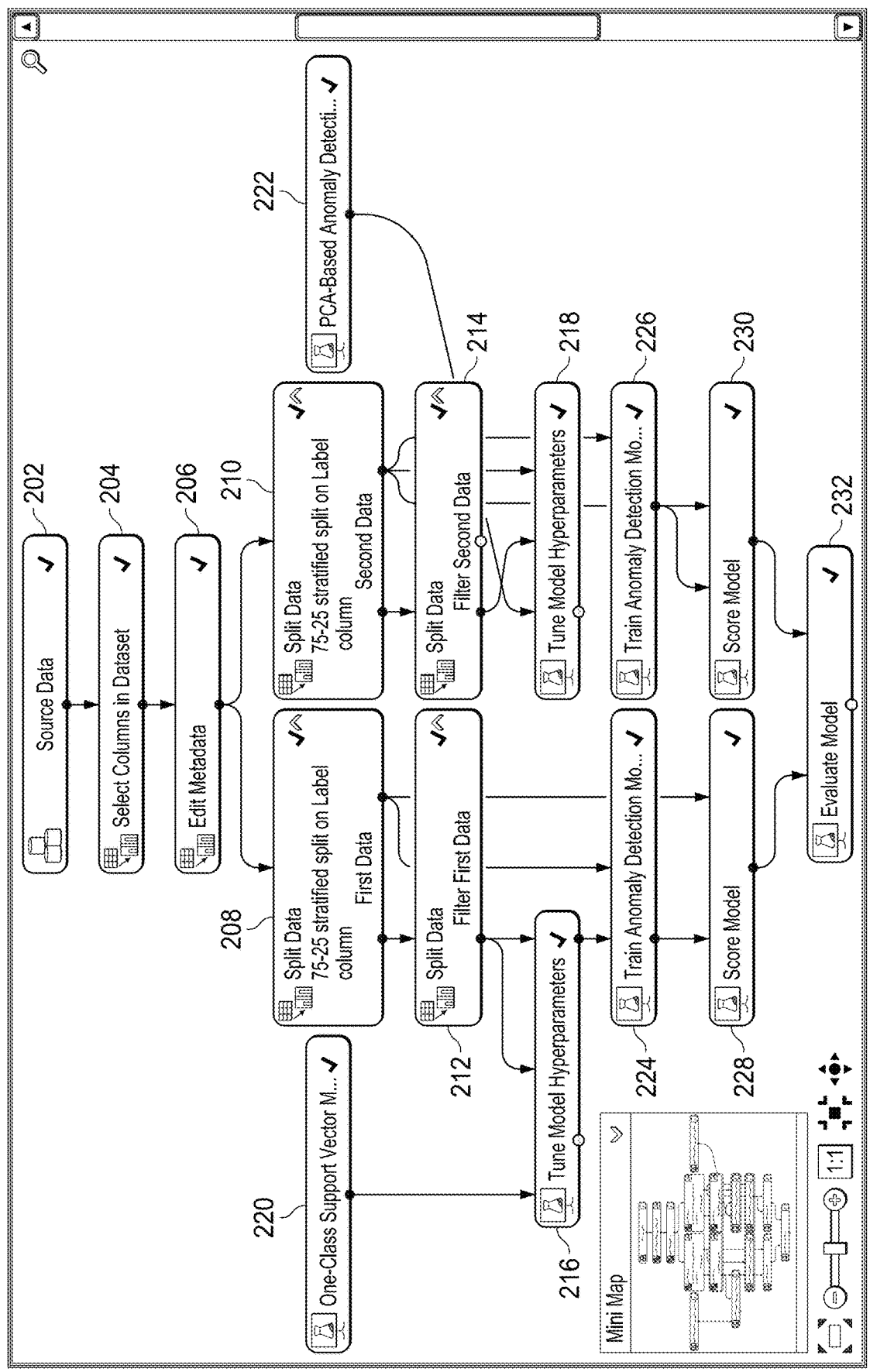
FIGS. 2 and 3 illustrate processes in accordance with disclosed embodiments.

FIG. 2 illustrates a process 200 in accordance with disclosed embodiments for analyzing data for machine learning to improve cybersecurity as disclosed herein. Such a process can be performed, for example by a security system 154 or other system or elements as disclosed herein (referred to generically as the "system" below).

The system receives source data (202). The source data can be, for example, a comma-separated-value (CSV) file or other file that describes data collected in a communications channel of a control system, whether as current communications channel information or known-good communications channel information.

The system selects a subset of the source data, such as specific columns in a data set (204). The collected source data can be of a known type or source to be analyzed according to the models disclosed herein to identify changes or characteristics that are abnormal to the communication channels, whether wired or wireless. Any of the models referenced below can be implemented as device model(s) 186.

The system can edit metadata for the source data (206). This optional action can be performed to label or otherwise identify specific data for further analysis, whether automated or manual.

The system can split the source data into first and second data so that different or parallel processes can be executed (208, 210). This is not required to be an even split; for example, the system could perform a 75%/25% stratified split on a Label column of the source data. For purposes of description, assume that the first data is the 75% split at 208 and the second data is the 25% split at 210. Splitting the data can be used to provide a subset of data used to train the models. Stratification can be used to ensure samples are taken from both "good" and potentially "bad" datasets. Of course, other data sampling or extraction techniques can be used.

The first and second data can be further filtered to select, for example, the rows with "normal" data that is not expected to show any anomalies (212, 214). When training models, such filtering can ensure that only known good data is fed into the model to enable it to learn the characteristics of the good data.

The system can then tune model hyperparameters (216, 218). This enables the model to be used with the most optimal hyperparameters. This step creates and tests models and iteratively determines the most optimal settings for the model.

For example, the system can tune model hyperparameters (216) according to the filtered first data 212 and a one-class support vector model 220 to produce a first model.

The system can train anomaly detection model (224) using the tuned first model and the unfiltered first data. The system can then score the first model (228).

In specific implementations, steps 224 and 228 can produce a trained anomaly detection model. The tuned model hyperparameters can be fed into the trained anomaly detection model along with a combination of good and bad data. This produces a score model that can be used to evaluate the effectiveness of the trained anomaly detection model.

The system can also process the second data. For example, the system can tune model hyperparameters (218) according to the filtered second data 214 and a PCA-based anomaly detection 222 to produce a second model.

The system can train anomaly detection model (226) using the tuned first model and the unfiltered first data. The system can then score the first model (230).

The system can combine the first and second models into a combined model, and evaluate the combined model (232). Alternately, where there is only a single model as opposed to first and second models, the system can evaluate the single model. This process can be used, in particular, to train and validate models according to data known to be "good" and data that reflects a potentially "bad" condition.

By analyzing communication channel information on a known valid dataset (the filtered first and second data as discussed above forming known process information), models can be trained to identify abnormalities and notify an operator for further inspection.

The communications channel information that can be analyzed and used to train these models and to analyze communication channel data can include, for example, distributed control system (DCS) data or IIoT operations data, such as communications channel data indicating normal operation of a DCS/IIoT application, communications channel data indicating DCS/IIoT application start up, communications channel data indicating DCS/IIoT application shutdown, communications channel data indicating telemetry checks, or communications channel data indicating process migration, among other information.

The communications channel information that can be analyzed and used to train these models and to analyze communication channel data can include, for example, controller/PLC operations data, such as communications channel data indicating activation, communications channel data indicating a start, communications channel data indicating a stop, communications channel data indicating a controller status change, communications channel data indicating an activation, communications channel data indicating an inactivation, communications channel data indicating a download of logic and configuration to controllers, communications channel data indicating upload of logic and configuration to controllers, or communications channel data indicating a logic modification. The logic modification can be, for example, activation of logic, deactivation of logic, a force point value change, a set point change, or output value change.

The communications channel information that can be analyzed and used to train these models and to analyze communication channel data can include, for example, asset management operations data, such as communications channel data indicating connection of management tools to ICS/IIoT endpoints, acknowledge alarms, or shelve alarms.

The communications channel information and data described above form a non-exclusive list or subset of the operations that are performed within an ICS/IIoT application that can be observed and collected. The collection of these operations enables Machine Learning technology to create models that offer capabilities that are nonexistent in the ICS/IIoT application space.

Using these models produced by processes as disclosed herein provides the capability of near real time anomaly detection within industrial communication channels that can detect data exfiltration efforts, malicious software behavior, and abnormal behavior resulting from hardware degradation.

By collecting such information to train machine learning models as described herein, the models can "learn" the above attributes for a given ICS or IIoT platform and offer insight when these values may suggest an abnormality on the system. The values above are relatively immutable in terms of their valid values and therefore are potential indicators that a system may be at risk.

Figure 3:
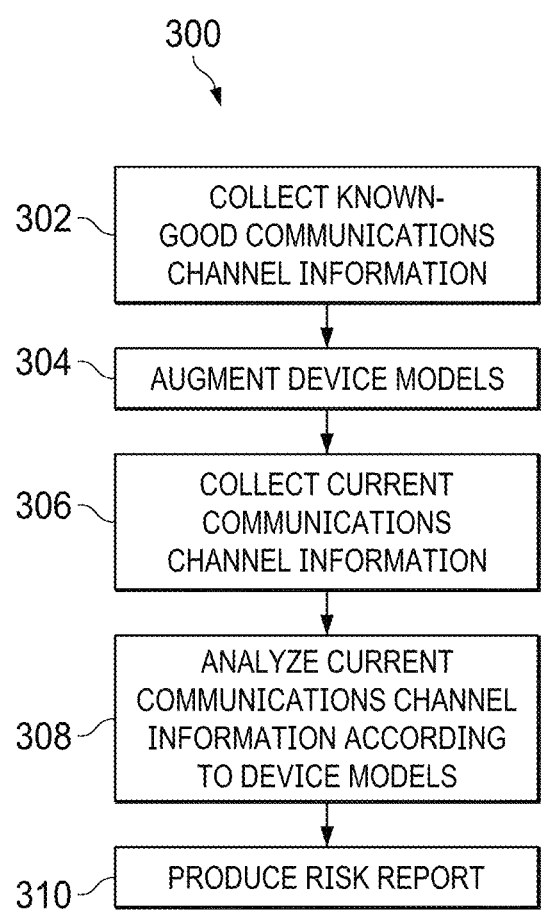

FIG. 3 illustrates a process 300 in accordance with disclosed embodiments that can be performed, for example, by a security system 154 or other system, referred to generically as the "system" below.

The system collects known known-good communications channel information for a plurality of devices executing in a control system (302). The devices can be any of those described above, including in particular ICS or IIoT devices. The communications channel information can be or include any of the communications channel data described above, and can be collected from the individual devices or from wired or wireless communications channels.

The system builds or augments one or more device models according to the known-good communications channel information (304). Collecting the known-good communications channel information and building or augmenting the device models can be performed repeatedly, occasionally, or continuously to train the models.

The system collects current communications channel information for a plurality of devices in the control system (306).

The system analyzes the current communications channel information according to the one or more device models (308).

According to the analysis, the system produces a risk report that identifies an abnormal device (310). The risk report can be in the form of a warning screen or indicator, a text message or email, or other electronic notification for use by a system operator or other user.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
    collecting, by a security system, current communications channel information for a plurality of devices in a control system;
    augmenting one or more device models according to the communications channel information, wherein augmenting includes tuning model hyperparameters to create and test one or more models;
    analyzing, by the security system, the current communications channel information according to one or more device models; and
    producing, by the security system and according to the analysis, a risk report that identifies an abnormal device among the plurality of devices.

2. The method of claim 1, further comprising:
    collecting, by the security system, known-good communications channel information for the plurality of devices in the control system; and
    augmenting, by the security system, the one or more device models according to the known-good communications channel information.

3. The method of claim 2, wherein the security system collects the known-good communications channel information and augments the one or more device models repeatedly, occasionally, or continuously.

4. The method of claim 1, wherein the current communications channel information includes distributed control system (DCS) data or Industrial Internet of Things (IIoT) operations data.

5. The method of claim 1, wherein the current communications channel information includes controller operations data.

6. The method of claim 1, wherein the current communications channel information includes asset management operations data.

7. The method of claim 1, wherein the current communications channel information is collected from a wired or wireless network.

8. A security system, comprising:
    a controller; and
    a memory in communication with the controller, wherein the controller is configured to:
    collect current communications channel information for a plurality of devices in a control system;
    augment one or more device models according to the communications channel information, wherein augmenting includes tuning model hyperparameters to create and test one or more models;
    analyze the current communications channel information according to one or more device models; and
    produce, according to the analysis, a risk report that identifies an abnormal device among the plurality of devices.

9. The security system of claim 8, wherein the controller is further configured to:
    collect known-good communications channel information for the plurality of devices in the control system; and
    augment the one or more device models according to the known-good communications channel information.

10. The security system of claim 9, wherein the security system collects the known-good communications channel information and augments the one or more device models repeatedly, occasionally, or continuously.

11. The security system of claim 8, wherein the current communications channel information includes distributed control system (DCS) data or Industrial Internet of Things (IIoT) operations data.

12. The security system of claim 8, wherein the current communications channel information includes controller operations data.

13. The security system of claim 8, wherein the current communications channel information includes asset management operations data.

14. The security system of claim 8, wherein the current communications channel information is collected from a wired or wireless network.

15. A non-transitory machine-readable medium encoded with executable instructions that, when executed, cause one or more controllers of a security system to:
    collect current communications channel information for a plurality of devices in a control system;
    augment one or more device models according to the communications channel information, wherein augmenting includes tuning model hyperparameters to create and test one or more models;
    analyze the current communications channel information according to one or more device models; and
    produce, according to the analysis, a risk report that identifies an abnormal device among the plurality of devices.

16. The non-transitory machine-readable medium of claim 15, wherein the non-transitory machine-readable medium is further encoded with executable instructions that, when executed, cause the one or more controllers of the security system to:
  collect known-good communications channel information for the plurality of devices in the control system; and
  augment the one or more device models according to the known-good communications channel information.

17. The non-transitory machine-readable medium of claim 16, wherein the security system collects the known-good communications channel information and augments the one or more device models repeatedly, occasionally, or continuously.

18. The non-transitory machine-readable medium of claim 15 wherein the current communications channel information includes distributed control system (DCS) data or Industrial Internet of Things (IIoT) operations data.

19. The non-transitory machine-readable medium of claim 15, wherein the current communications channel information includes controller operations data.

20. The non-transitory machine-readable medium of claim 15, wherein the current communications channel information includes asset management operations data.

\* \* \* \* \*